United States Patent Office 3,459,677
Patented Aug. 5, 1969

3,459,677
PREPARATION OF COBALTOUS ACETATE SOLUTIONS
Max O. Robeson, Salisbury, N.C., assignor to Celanese Corporation, New York, N.Y., a corporation of Delaware
No Drawing. Filed May 19, 1966, Ser. No. 551,242
Int. Cl. B01j 11/82; C07b 3/00
U.S. Cl. 252—431
4 Claims

ABSTRACT OF THE DISCLOSURE

High concentration solutions of cobaltous acetate in acetic acid, useful as liquid-phase oxidation catalysts after oxidation to the cobaltic state, are prepared by adding cobaltous acetate tetrahydrate to the solvent, gradually with stirring, at a temperature below about 28° C., until about 10 to 30 weight percent cobaltous acetate tetrahydrate based on total weight of the mixture has been added. The mixture is then heated to complete dissolution of the cobalt acetate, temperature being left below 80° C. The dissolved cobaltous acetate can then be oxidized to cobaltic acetate.

---

This invention relates to the preparation of high concentrations of cobaltous compounds in acid solutions. More particularly this invention relates to the preparation of high concentrations of cobaltous acetate in acetic acid solutions.

It is an object of this invention to provide a simple method of preparing a solution of cobaltous acetate in high concentrations in acetic acid and acetic acid-water mixtures. Another object of this invention is to provide high concentrations of cobaltous acetate in acetic acid solutions for oxidation to cobaltic acetate useful as a catalyst in many liquid phase oxidation reactions.

It is well known that cobaltous acetate tetrahydrate is soluble to a very limited extent in acetic acid and acetic acid-water mixtures containing less than about 10 wt. percent water. It has been necessary in the past, in order to prepare an acetic acid solution of cobaltous acetate containing Co(II) in a relatively high concentration, to dissolve a small amount of acetate tetrahydrate in acetic acid and to oxidize the cobaltous acetate to cobaltic acetate with simultaneous or subsequent addition of more cobaltous compound to the acetic acid solution to make up for the amount of cobaltic acetate dissolved in the solution, cobaltic acetate being extremely soluble in acetic acid. Such a method is disclosed, for example, in U.S. Patents 1,976,757 and 2,588,388. Such a procedure is both time consuming and an inefficient way of preparing such cobalt compositions.

It has now been found that cobaltous acetate tetrahydrate can be dissolved in substantial amounts in acetic acid or acetic acid-water solutions containing less than about 10 wt. percent water, provided a certain process is employed. This process comprises (1) Adding cobaltous acetate to a solution of acetic acid or an acetic acid-water mixture at a relatively slow rate at a temperature less than about 28° C. with stirring and without the addition of added heat, and (2) Heating the solution to accomplish the dissolution.

Provided the above procedure is followed, about 90–95% of the cobaltous salt is dissolved on addition of the salt to the acetic acid solution, and when the solution is heated, the remainder dissolves almost immediately. If the procedure is not followed the cobaltous salt will not dissolve as a result of heating, adding water, or stirring for extended periods of time.

The exact reason for the peculiar behavior of cobaltous acetate tetrahydrate is not known; however, it is apparent that when the cobaltous acetate tetrahydrate is added to warm or hot acetic acid, dehydration of the cobaltous acetate tetrahydrate occurs giving anhydrous cobaltous acetate which is more insoluble than the tetrahydrate compound.

The cobaltous acetate tetrahydrate is preferably added to the acetic acid solution at ambient temperatures, i.e. about 28° C. or less. If the cobalt salt is added in a batch amount at a higher temperature, for example at about 30–35° C., dehydration and precipitation occurs. It is also important that the cobalt salt be added to the acetic acid solution without added heat. Generally, on the addition of a certain amount of cobaltous acetate tetrahydrate to an acetic acid solution at the preferred temperatures mentioned above, 90–95 wt. percent of the salt dissolves rapidly with the remainder dissolving on heating the acetic acid solution to a temperature ranging from about 50–80° C. At temperatures above 80° C., i.e. about 90° C. in glacial acetic acid, dehydration of the cobaltous acetate tetrahydrate occurs with precipitation of the cobalt salt from the acid solution. Thus, after preparation of cobaltous acetate in acetic acid or acetic acid-water mixtures, care must be taken not to heat the cobalt solution to temperatures much above about 80° C.

By following the process outline above acetic acid solutions of cobaltous acetate containing 10–30 wt. percent or higher cobalt salt can be obtained with ease.

A further advantage of the invention is the provision of a high concentration of cobaltous acetate tetrahydrate in solution for activation to the corresponding cobaltic salt using known oxidizing agents. Cobaltous acetate tetrahydrate solutions in acetic acid or acetic acid-water mixtures can be oxidized with much more ease and in a shorter length of time provided the cobaltous compound is completely in solution. Oxidizing agents which may be used to oxidize the cobaltous ion to the cobaltic ion are well known. These include aldehydes, such as acetaldehyde; ketones, such as methyl ethyl ketone; halogen containing compounds; peroxygen compounds, such as peracetic acid and hydrogen peroxide; and many others.

After oxidizing the cobaltous ion to the cobaltic state, the cobalt containing solution can be used as a catalyst solution for many liquid phase oxidation reactions.

The following examples are intended to illustrate the instant invention but are not intended to limit it any way.

EXAMPLE I

Fifty grams of cobaltous acetate $$(Co(C_2H_3O_2)_2 \cdot 4H_2O)$$

were added to 250 grams of glacial acetic acid with stirring at 25° C. The solution was stirred for about 5 or 10 minutes in which time about 90–95% of the cobaltous acetate tetrahydrate dissolved in the acetic acid. The remainder of the cobaltous acetate tetrahydrate was dissolved by warming the acetic acid solution to a temperature ranging from 50–70° C. A solution containing 16.7 wt. percent cobaltous acetate was obtained.

EXAMPLE II

About 75 grams of cobalt acetate tetrahydrate were added to 250 grams acetic acid by adding all of the cobalt compound at once to glacial acetic acid at a temperature of 30° C. The cobalt salt precipitated out and would not dissolve even at 180° C. and 60 p.s.i.g.

EXAMPLE III

About 75 grams of cobaltous acetate tetrahydrate were added in incremental amounts to 250 grams of glacial acetic acid while slowly heating the acetic acid from 25°

C. to 50° C. The catalyst precipitated and would not redissolve as a result of heating for an extended time or as a result of the addition of water up to 100% concentration.

Taking the cobaltous acetate tetrahydrate-glacial acetic acid solution prepared in Example I, 72 grams of methyl ethyl ketone were added to the cobalt solution and the mixture heated in the presence of air to 140° C. On removal the cobalt solution was found to contain about 1:1 ratio of Co(II) to Co(III).

The embodiments of the invention in which an exclusive property or privilege is claimed are defined as follows:

1. A process for the preparation of a high concentration of cobaltous acetate tetrahydrate in a solvent selected from the group consisting of glacial acetic acid and acetic acid-water mixtures which comprises
   (1) adding the cobalt salt to the solution at a temperature less than about 28° C. with stirring and without added heat until 10% to 30% by weight of said salt has been incorporated into the solution, and
   (2) heating the resulting solution at a temperature below 80° C. to complete dissolution.

2. Process according to claim 1 wherein the solution, after addition of the cobalt salt, is heated up to a temperature between about 50° C. and 80° C.

3. Process according to claim 1 wherein the concentration of cobaltous acetate tetrahydrate is about 16 wt. percent, the salt is added to the solvent at about 25° C., and the solution after addition of the salt is warmed to a temperature ranging from about 50° C. to about 70° C.

4. Process wherein the cobaltous acetate prepared according to claim 1 is oxidized to cobaltic acetate in the presence of an oxidizing agent.

References Cited
UNITED STATES PATENTS

| | | | |
|---|---|---|---|
| 3,139,452 | 6/1964 | Hay | 260—524 |
| 2,497,889 | 2/1950 | Hull | 260—523 |

PATRICK P. GARVIN, Primary Examiner

U.S. Cl. X.R.

260—439